US009602626B2

(12) United States Patent
Desai et al.

(10) Patent No.: US 9,602,626 B2
(45) Date of Patent: *Mar. 21, 2017

(54) ENABLING PEER-TO-PEER CONTENT RETRIEVAL IN HTTP (71) Applicant: Microsoft Technology Licensing, LLC, Redmond, WA (US)

(72) Inventors: Anish V. Desai, Bellevue, WA (US); Jonathan A. Silvera, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

This patent is subject to a terminal disclaimer.

(21) Appl. No.: 14/052,900

(22) Filed: Oct. 14, 2013

(65) Prior Publication Data

US 2014/0047077 A1 Feb. 13, 2014

Related U.S. Application Data (63) Continuation of application No. 13/586,392, filed on Aug. 15, 2012, now Pat. No. 8,583,813, which is a continuation of application No. 12/505,314, filed on Jul. 17, 2009, now Pat. No. 8,266,310.

(51) Int. Cl.
*H04L 29/08* (2006.01)
*H04L 29/06* (2006.01)
*H04L 29/12* (2006.01)

(52) U.S. Cl.
CPC ............ *H04L 67/32* (2013.01); *H04L 67/02* (2013.01); *H04L 67/104* (2013.01); *H04L 29/12066* (2013.01); *H04L 63/0428* (2013.01)

(58) Field of Classification Search
CPC ............... H04L 67/104; H04L 67/1072; H04L 67/1093; G06F 17/30206; G06F 17/30209
USPC ............... 709/203, 219, 227, 230, 242, 246
See application file for complete search history.

(56) References Cited

U.S. PATENT DOCUMENTS

| 7,062,567 | B2 | 6/2006 | Benitez et al. |
| 7,496,649 | B2 | 2/2009 | Lee, IV et al. |
| 7,509,393 | B2 | 3/2009 | Agarwalla et al. |
| 7,881,315 | B2 * | 2/2011 | Haveson ............ H04L 12/2812 370/401 |
| 8,266,310 | B2 | 9/2012 | Desai et al. |
| 2002/0107982 | A1 * | 8/2002 | Teodosiu .......... H04L 29/12066 709/245 |

(Continued)

OTHER PUBLICATIONS

Peer Content Caching and Retrieval: Hypertext Transfer Protocol (HTTP) Client Extensions, Microsoft Corporation, Apr. 6, 2009, http://download.microsoft.comldownload/9/5/E/95EF66AF-9026-4BBO-A41D-A4F81802D92C/%5BMS-PCCRTP%5D.pdf, 15 pgs.

(Continued)

*Primary Examiner* — Barbara Burgess (57) ABSTRACT

Described are embodiments directed to enabling the retrieval of content from a peer-to-peer network. In embodiments, a client requesting content from a server can indicate in an HTTP request that it is capable of retrieving content from a peer-to-peer network. When the server receives the HTTP request it will recognize the indication that the client is capable of retrieving content from a peer-to-peer network and may send content information instead of sending the requested content. The content information allows the client to retrieve the content from the peer-to-peer network.

20 Claims, 6 Drawing Sheets

(56) References Cited

U.S. PATENT DOCUMENTS

| | | | | |
|---|---|---|---|---|
| 2002/0198930 A1* | 12/2002 | Jones | ............... | H04L 29/06 709/201 |
| 2004/0148344 A1* | 7/2004 | Navar | ............... | H04L 29/06 709/203 |
| 2007/0174428 A1 | 7/2007 | Lev Ran et al. | | |
| 2008/0046596 A1 | 2/2008 | Afergan et al. | | |
| 2008/0215750 A1 | 9/2008 | Farber et al. | | |
| 2008/0229217 A1 | 9/2008 | Kembel et al. | | |
| 2008/0255944 A1* | 10/2008 | Shah | ............... | G06Q 30/02 705/14.47 |
| 2008/0256611 A1 | 10/2008 | Gmuender et al. | | |
| 2009/0106393 A1* | 4/2009 | Parr | ............... | H04L 63/0428 709/218 |

OTHER PUBLICATIONS

Protocol Overview (Synopsis), Microsoft Corporation, 2009, http://msdn.microsoft.com/en-us/library/dd342960(PROT10).aspx, 1 page.

Krishnamurthy et al., "Key Differences between HTTP=1.0 and HTTP=1.1", Elsevier Science B.V 1991, http://www.cse.hcmut.edu.vn/~khoatran/course/computernetwork/key_difference_http.pdf, 15 pgs.

Receiving a PeerDist-Supporting Request, Microsoft Corporation, 2009, http://msdn.microsoft.com/en-us/library/dd340925(PROT.10).aspx, 1 page.

U.S. Appl. No. 12/505,314, Notice of Allowance mailed May 10, 2012, 11 pages.

U.S. Appl. No. 12/505,314, Amendment and Response filed Feb. 23, 2012, 12 pages.

U.S. Appl. No. 12/505,314, Office Action mailed Nov. 23, 2011, 9 pages.

U.S. Appl. No. 12/505,314, Amendment filed Sep. 14, 2011, 12 pages.

U.S. Appl. No. 12/505,314, Office Action mailed Jun. 14, 2011, 8 pages.

U.S. Appl. No. 12/505,314, Supplemental Amendment and Response filed Jun. 7, 2011, 12 pages.

U.S. Appl. No. 12/505,314, Amendment and Response filed Apr. 4, 2011, 11 pages.

U.S. Appl. No. 12/505,314, Office Action mailed Jan. 4, 2011, 9 pages.

U.S. Appl. No. 13/586,392, Office Action mailed Dec. 26, 2012, 12 pages.

U.S. Appl. No. 13/586,392, Amendment and Response filed Mar. 26, 2013, 12 pages.

U.S. Appl. No. 13/586,392, Notice of Allowance mailed Jul. 12, 2013, 7 pages.

* cited by examiner

ENABLING PEER-TO-PEER CONTENT RETRIEVAL IN HTTP

CROSS-REFERENCE TO RELATED APPLICATIONS

This application is a continuation application of U.S. patent application Ser. No. 13/586,392, now U.S. Pat. No. 8,583,831, entitled "ENABLING PEER-TO-PEER CONTENT RETRIEVAL IN HTTP," filed on Aug. 15, 2012, which application is a continuation application and claims priority to U.S. patent application Ser. No. 12/505,314, now U.S. Pat. No. 8,266,310, entitled "ENABLING PEER-TO-PEER CONTENT RETRIEVAL IN HTTP," filed Jul. 17, 2009, the complete disclosures of which are hereby incorporated herein by reference.

BACKGROUND

The Hypertext Transfer Protocol (HTTP) is used in transactions over networks, such as the Internet, whereby a browser on a client will request information from a server. The server will respond using an HTTP response with the requested information e.g., a web page. On some occasions a server can be inundated with requests from browsers and be unresponsive or incur large latencies in responding to browser requests. This is common in situations when the server does not have enough resources, such as bandwidth, storage space, and computing power to respond to the multitude of browser requests that the server receives. Moreover, even in situations when a server is not overloaded, retrieving information from a server over a wide area network (WAN) is more expensive and takes longer than retrieving information from a local area network (LAN).

There are some solutions that have been implemented to alleviate the above identified problems. Servers can be upgraded to include resources that exceed expected usage. For example, a server may be implemented as a server farm with a number of different servers that share the load of responding to browser requests and also provide redundancy in case of a failure. Another solution is to purchase additional bandwidth. However, these solutions are expensive because they require the purchase of additional hardware or services.

It is with respect to these and other considerations that the embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Described are embodiments directed to enabling the retrieval of content from a peer-to-peer network. In embodiments, a client requesting content from a server can indicate in an HTTP request that it is capable of retrieving content from a peer-to-peer network. When the server receives the HTTP request it will recognize the indication that the client is capable of retrieving content from the peer-to-peer network and may send content information instead of sending the requested content. The content information allows the client to retrieve the content from the peer-to-peer network. In embodiments, if the client cannot retrieve the information from the peer-to-peer network, the client can send a second HTTP request to the server without the indication which results in the server sending the requested content.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
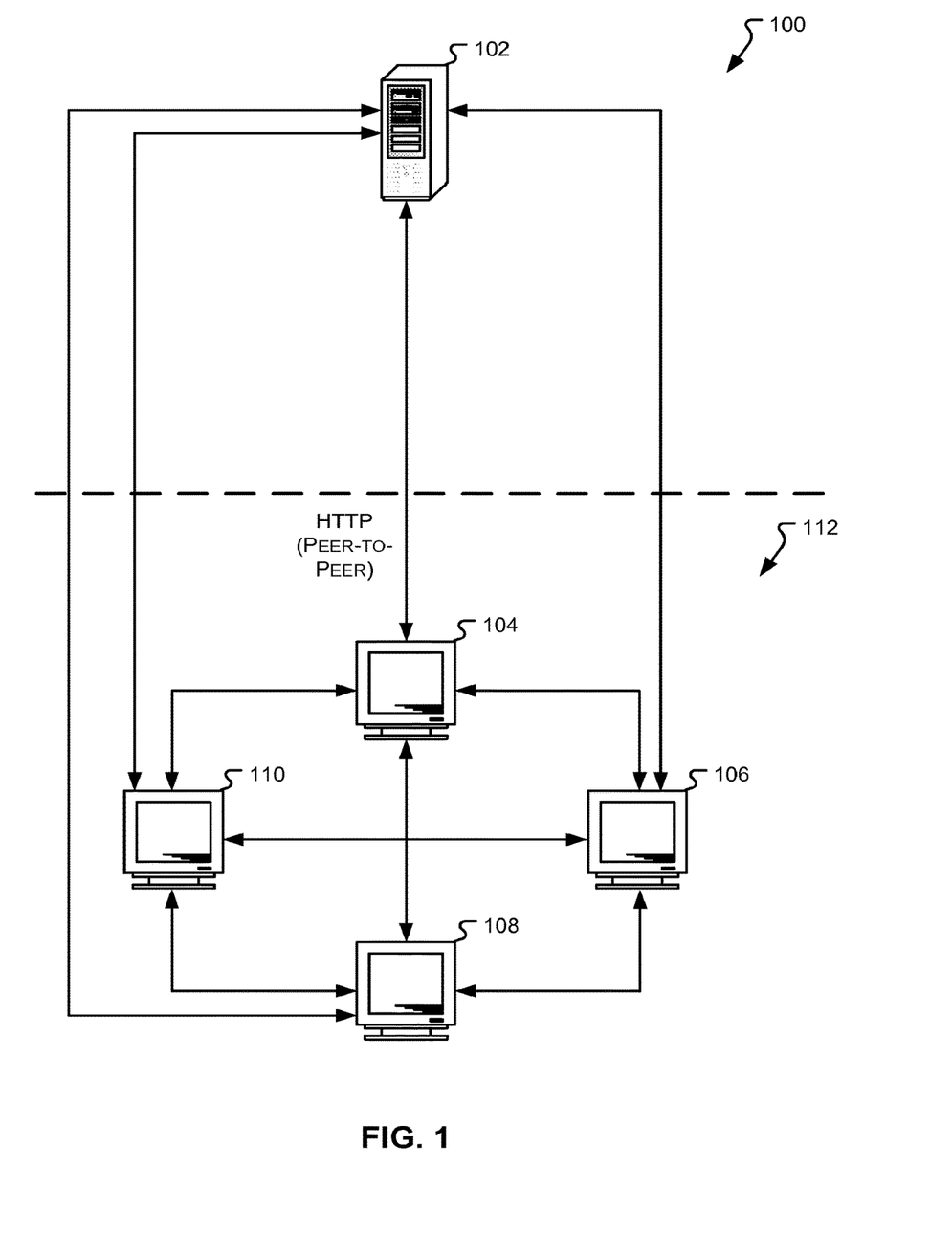
FIG. 1 illustrates a system including a content server and a peer-to-peer network, according to an embodiment.

FIG. 1 illustrates a system 100, according to an embodiment. System 100 includes a content server 102, client 104, client 106, client 108, and client 110. Each of clients 104, 106, 108, and 110 can send requests to retrieve content stored on content server 102. The content server 102, client 104, client 106, client 108, and client 110 are part of a wide-area network (WAN) such as the Internet. Each of the clients, in embodiments, include an application such as a web browser that sends hypertext transfer protocol (HTTP) requests for content, e.g., web pages, streaming media or other information, to server 102. Content server 102 will process the HTTP requests and send HTTP responses with the requested content to clients 104, 106, 108, and 110. As those with skill in the art will appreciate, HTTP is a protocol that is used to transfer hypertext requests and information between a server and a browser. HTTP is the underlying protocol used by the Internet and the World Wide Web.

As seen in FIG. 1, clients 104, 106, 108, and 110 are also part of a peer-to-peer network 112 that allows the clients to connect to one another, for example, to retrieve content stored on any one of the clients. As those with skill in the art will appreciate, the use of a peer-to-peer network such as network 112 provides a number of advantages over a client-server network. For example, all of clients 104, 106, 108, and 110 provide resources, such as bandwidth, storage space, and computing power to network 112. Also, when another client computer is added to network 112, the client not only creates a load on the network by issuing requests but also provides additional resources. In contrast, in a client-server network adding more clients could result in slower data transfer for all clients. Further, the distributed nature of network 112 also increases robustness because data is stored on multiple clients instead of on a single server. Thus, there is no single point of failure in the system. In some embodiments, network 112 is part of a local area network (LAN).

In embodiments, the advantages of peer-to-peer network 112 can be utilized by enabling server 102 to have clients 104, 106, 108, and 110 retrieve content from network 112 instead of transferring information from server 102 over the WAN. In order to enable this feature, server 102 must determine from an HTTP request sent by one of the clients that the client is capable of retrieving content from one of its peers within network 112. Thus, in accordance with one embodiment, the HTTP request includes an indication that the sending client is capable of retrieving content from within network 112. Upon determining that the sending client can retrieve content from network 112, server 102 can, instead of sending the requested content, send an HTTP response with information that allows the client to retrieve the information from one of its peers within network 112. As explained in greater detail below, the HTTP request sent by the client and the HTTP response sent by the server are encoded in a way that enables this feature.

As a specific example, client 104 may include a web browser for browsing information on the Internet. A user utilizing the web browser on client 104 may request content from content server 102, which may be a web server. Client 104 will generate an HTTP request encoded with information indicating that client 104 is capable of retrieving the content from within a peer-to-peer network such as network 112. When content server 102 receives the request from client 104, it will determine that the request indicates that client 104 can retrieve content from a peer-to-peer network. Accordingly, server 102 does not have to send the requested content to client 104. Instead, server 102 will send an HTTP response that includes content information, e.g., information about the requested content, that client 102 can use to retrieve the content from network 112. Sending an HTTP response with content information, instead of the content itself, utilizes less bandwidth since the content information may be in some instances orders of magnitude smaller than the actual content.

Server 102 will thus generate an HTTP response with content information and send the response to the client 104. After client 104 receives the HTTP response, it will use the content information to generate and send a request to one of its peers, i.e., clients 106, 108, or 110, requesting the content. In some embodiments, the request sent to one of its peers includes the content information or information derived from the content information. The request sent to clients 106, 108, or 110 may be formatted according to any suitable peer-to-peer protocol which may be implemented by network 112. In response to the request, client 104 will receive the content from one of its peers.

It should be understood that FIG. 1 is non-limiting and is for illustration purposes only. For example, FIG. 1 illustrates only a single server 102, which is connected to clients 104, 106, 108, and 110. As those with skill in the art will appreciate, in embodiments there may be more than one server each of which receives requests from any of clients 104, 106, 108, and 110 through one or more networks (not shown). Also, although FIG. 1 shows only four clients, in embodiments network 112 includes more, or less, than four client computers and may include server computers that are part of network 112.

Figure 2:
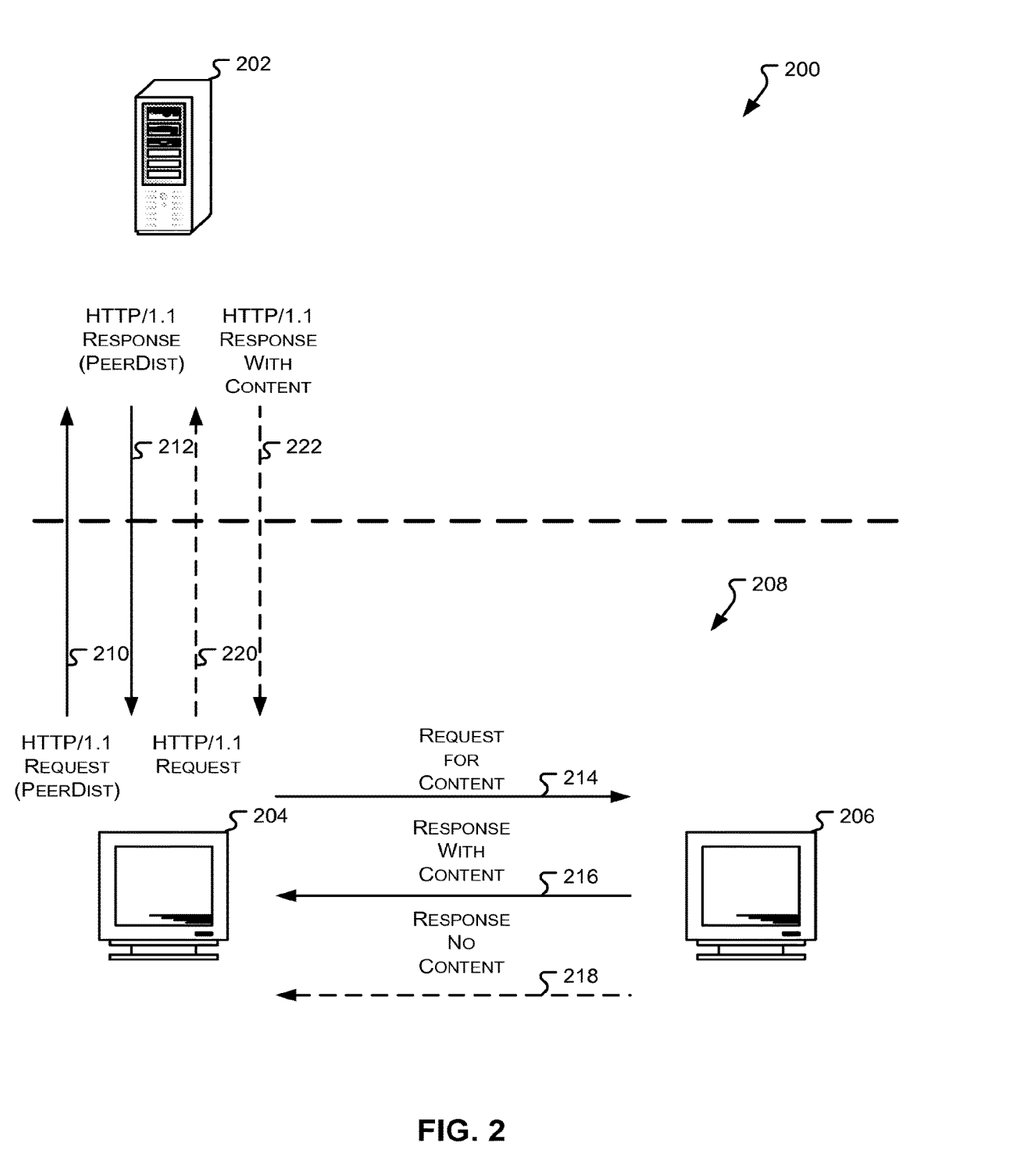
FIG. 2 more specifically illustrates a system including a content server and a peer-to-peer network, according to an embodiment.

FIG. 2 shows a system 200 in accordance with an embodiment. System 200 includes a content server 202, a client computer 204, and a client computer 206. As seen in FIG. 2, client computers 204 and 206 are part of a peer-to-peer network 208. In the embodiment shown in FIG. 2, content server 202, client computer 204, and client computer 206 are part of a WAN. Clients 204 and 206 exchange hypertext requests and responses using HTTP/1.1 with the server 202. HTTP/1.1 is the most recent version of an HTTP in common use. HTTP/1.1 is defined by RFC 2616, published by the Internet Engineering Task Force (IETF), and is hereby incorporated by reference in its entirety. Network 208 implements a peer-to-peer protocol that allows the exchange of information between client 204 and client 206.

In the embodiment illustrated in FIG. 2, client 204 includes a web browser that implements HTTP/1.1. The web browser (not shown) on client 204 issues a request for content stored on content server 202. Client 204 will generate an HTTP/1.1 request 210 encoded with information indicating that client 204 is capable of retrieving the content from within a peer-to-peer network such as network 208. In one embodiment, the encoding will be placed within a field in a header provided by HTTP/1.1. For example, HTTP/1.1 provides an Accept-Encoding header field that is used for indicating compression formats that are acceptable to a client. In one embodiment, the Accept-Encoding field is used to indicate that the client can retrieve information from a peer-to-peer network such as network 208. Client 204 can specify for example "peerdist" in the Accept-Encoding field along with other encoding formats that are acceptable, such as is illustrated below:

Accept-Encoding: gzip, deflate, peerdist
X-P2P-PeerDist: Version=1.0

In addition to the encoding, a version of the peer-to-peer content encoding can also be included to distinguish between versions of a peer-to-peer content encoding. This feature allows the encoding to be extended to create versions that may include additional features.

As shown in FIG. 2, client 204 sends the HTTP/1.1 request 210 with the peerdist indication in the Accept-Encoding field to server 202. When content server 202 receives the request 210 from client 204, it will determine that the request includes the peerdist indication. Accordingly, server 202 does not have to send the requested content to client 204 and can instead send an HTTP response 212 that includes content information that client 204 can use to retrieve the content from network 208. As described in greater detail below with respect to FIG. 3, content information may include in some embodiments, hashes of the requested content.

Server 202 will thus generate an HTTP/1.1 response 212 with content information and send the response to the client 204. The server 202 may utilize fields in the HTTP/1.1 response header to indicate that the response is encoded with content information instead of the content. In one implementation, the Content-Encoding field of the HTTP/1.1 response 212 header will include a "peerdist" indication to indicate that the response 212 includes content information instead of the actual content. For example, the header may be formatted as follows:

Content-Encoding: peerdist
Content-Length: 198
X-P2P-PeerDist: Version=1.0, ContentLength=184946

In addition to the "peerdist" indication, the HTTP/1.1 response 212 includes the version of the peer-to-peer content encoding, which is used to distinguish between versions of a peer-to-peer content encoding. As also illustrated in the embodiment above, the HTTP/1.1 response 212 includes information about the length of the content information included in the response 212. The content information is indicated as having a length of 198 bytes. The header also includes the length of the actual content requested by client 204. The length of the actual content is indicated as 184,946 bytes. As this illustrates, there is a very significant reduction in bandwidth when sending the content information instead of the actual content.

Referring again to FIG. 2, after client 204 receives the HTTP/1.1 response 212, it will use the content information to generate and send a request 214 to one of its peers in network 208, which in the embodiment shown in FIG. 2 is client 206. The request 214 is formatted according to any suitable peer-to-peer protocol which may be implemented by client 204 and client 206 in network 208. The request 214 may in some embodiments include the content information. In other embodiments, the request 214 will include information derived from the content information.

If client 206 has the requested content, it will send a response 216 to client 204 with the requested content. However, as shown in FIG. 2, if client 206 does not have the requested content it will send a response 218 back to client 204 indicating that it does not have the requested content.

In those instances in which client 204 receives a response 218 back from client 206 indicating that client 206 did not have the requested content, client 204 sends a second HTTP/1.1 request 220 to server 202 for the content. As illustrated in FIG. 2, client 204 will generate and send a second request 220 to server 202 without the "peerdist" indication in the HTTP/1.1 request header. Accordingly, when server 202 receives the second request 220 it will treat the request as a normal request for content and will respond with a second HTTP/1.1 response 222 including the requested content.

In other embodiments, if client 206 does not have the requested content, client 204 may send a request to another peer client instead of generating another HTTP/1.1 request 220 to server 202. In some embodiments, client 204 is configured to send the request for content to a predetermined number of peers to retrieve the content before sending a second HTTP/1.1 request 220 to server 202. In these embodiments, client 204 may send requests for content to two or more of its peers before generating and sending a second request 220 to server 202 without the "peerdist" in the HTTP/1.1 request header to retrieve the content from server 202. In yet other embodiments, a predetermined period of time may be allocated for client 204 to retrieve content from one of its peers. After the predetermined period time has expired, client 204 will generate and send a second request 220 to server 202 without the "peerdist" indication in the HTTP/1.1 request header to retrieve the content from server 202.

System 200 provides a number of advantages over conventional systems that rely on a server to provide all of the requested content to clients. By allowing content to be retrieved by a peer, server 202 can process requests more quickly since it does not have to generate responses with the full length of the requested content. This improves the overall performance of server 202 making it less likely to be unavailable. Also, as noted above, the bandwidth used to send responses is dramatically reduced because the content information is significantly smaller than the actual content. Additionally, when client 204 receives the content from a peer it is typically significantly faster than when client 204 receives the content from server 202.

Figure 3:
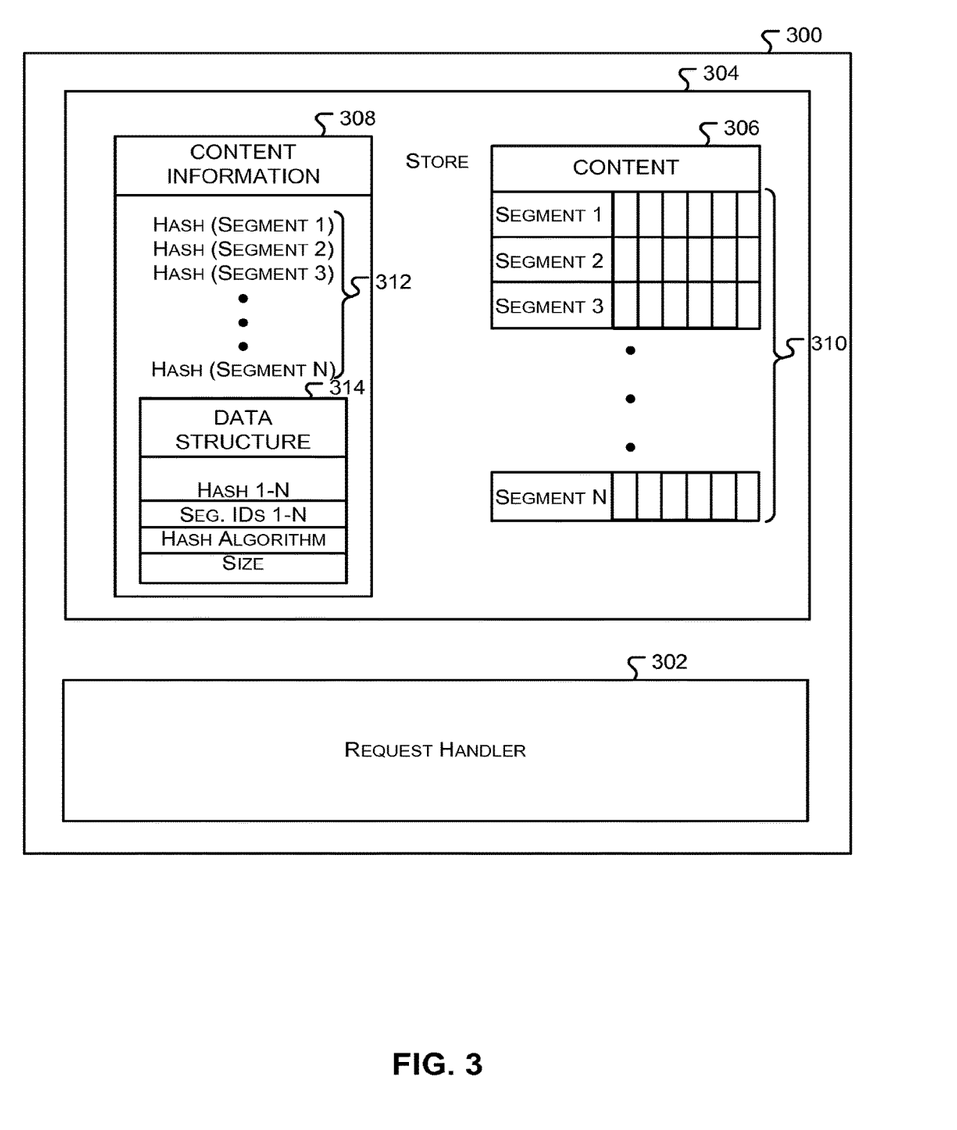
FIG. 3 illustrates a content server, according to an embodiment.

FIG. 3 illustrates a server 300 according to an embodiment. Server 300 is similar to server 102 (FIG. 1) and server 202 (FIG. 2). As shown in FIG. 3, server 300 includes a request handler 302 and a store 304. Store 304 stores content 306 which may be retrieved by clients, such as clients 104-110 (FIG. 1) and clients 204 and 206 (FIG. 2). In addition, store 304 also stores content information 308 associated with content 306 and which may be sent in HTTP responses in lieu of content 306.

In the embodiment illustrated in FIG. 3, content 306 is divided up into a number of segments 310. Each of the segments is further divided into a number of blocks. As those with skill in the art will appreciate, in other embodiments content 306 may be divided up in a variety of different ways. As shown in FIG. 3, content information 308 includes a number of hashes 312, each of which is associated with one of segments 310 of content 306. In one embodiment, each of hashes 312 are generated by inputting one of segments 310 of content 306 into a hash function. Some non-limiting examples of hashing algorithms that may be used in generating hashes 312 include SHA-0, SHA-1, SHA-2 (e.g., SHA-256, SHA-384, or SHA-512), and MD-5.

In other embodiments, hashes 312 may involve more than merely hashing the individual segments 310 of content 306. For example, in one embodiment each of the blocks associated with a segment may be hashed individually to generate a number of first hashes. Next, the first hashes may be input into a hash function again to generate one of hashes 312. Furthermore, a number of different types of information, in addition to content 306 may be input into hash functions to generate hashes 312. For example, to include a layer of security, each of hashes 312 may be generated using an encryption key such as a secret that is known by both server 300 and by authorized clients.

In some embodiments, hashes 312 are only a portion of the content information 308 that is sent from server 300 when responding to client requests. For example, in some embodiments server 300 may send a data structure 114 with content information 308 that includes hashes 312 but also includes other information such as segment identifiers that identify the segment with which hashes 312 are associated. The data structure may further include information such as the specific hash algorithm used to generate hashes 312, the size of the content information 308, and the size of the content 306.

Server 300 generally operates as described below. An HTTP request for content is received by request handler 302, which will determine whether the request includes an indication that the requesting client can retrieve the requested content from a peer-to-peer network. If request handler 302 determines that the request does not include such an indication, request handler will generate an HTTP response that includes the content 306. If request handler 302 determines that the request does include an indication that the client can retrieve the requested content from the peer-to-peer network, request handler 302 will generate an HTTP response that includes the hashes 312 of content 306 instead of content 306. As noted above, in some embodiments the HTTP response that includes the hashes 312 may include a data structure 314 that in addition to hashes 312 also includes segment identifiers that identify the segments of content 306, information identifying the hash algorithm used to generate hashes 312, the length of the content information 308, or the length of content 306.

Figure 4:
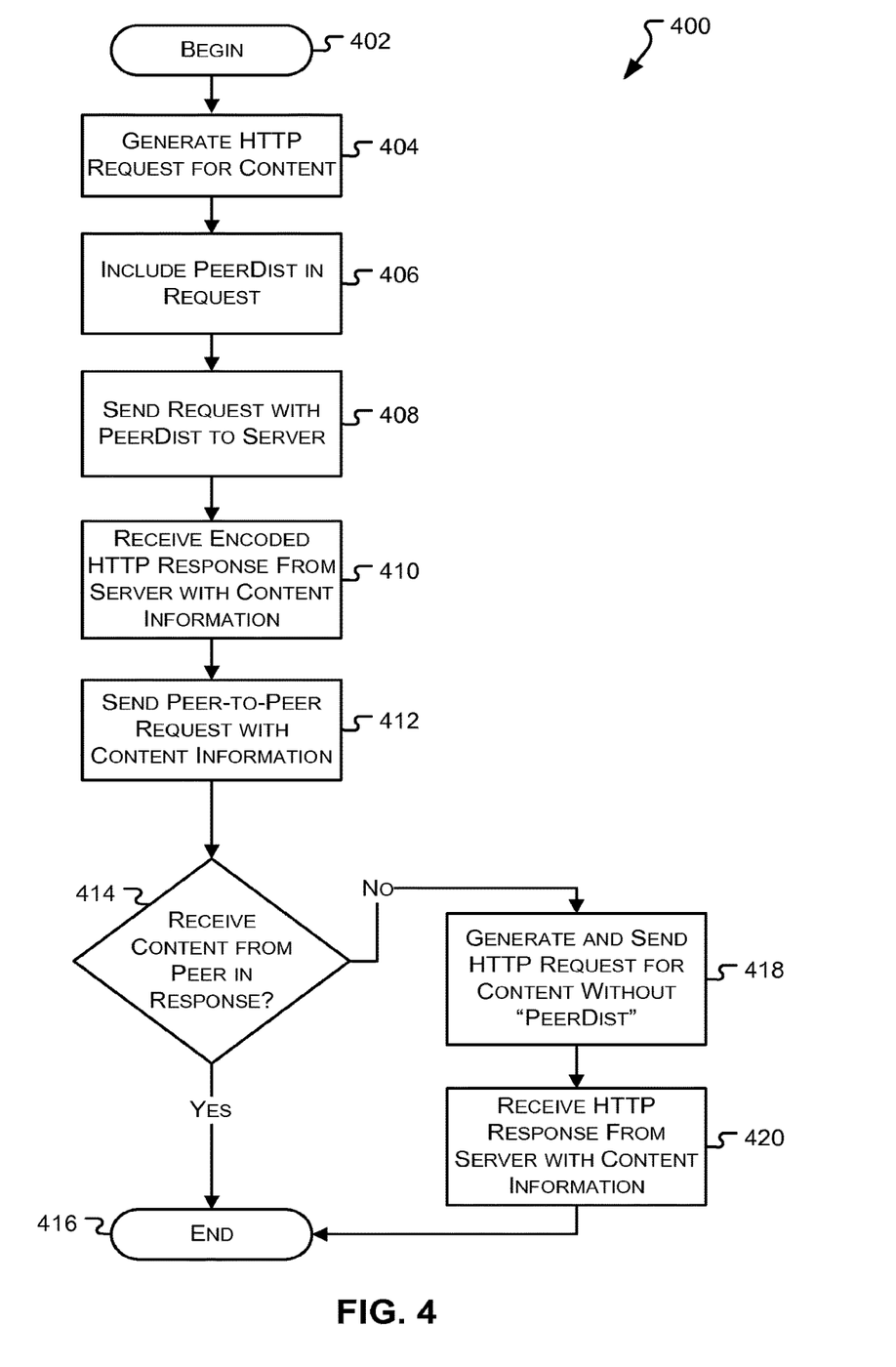
FIG. 4 illustrates an operational flow for retrieving content, according to an embodiment.
Figure 5:
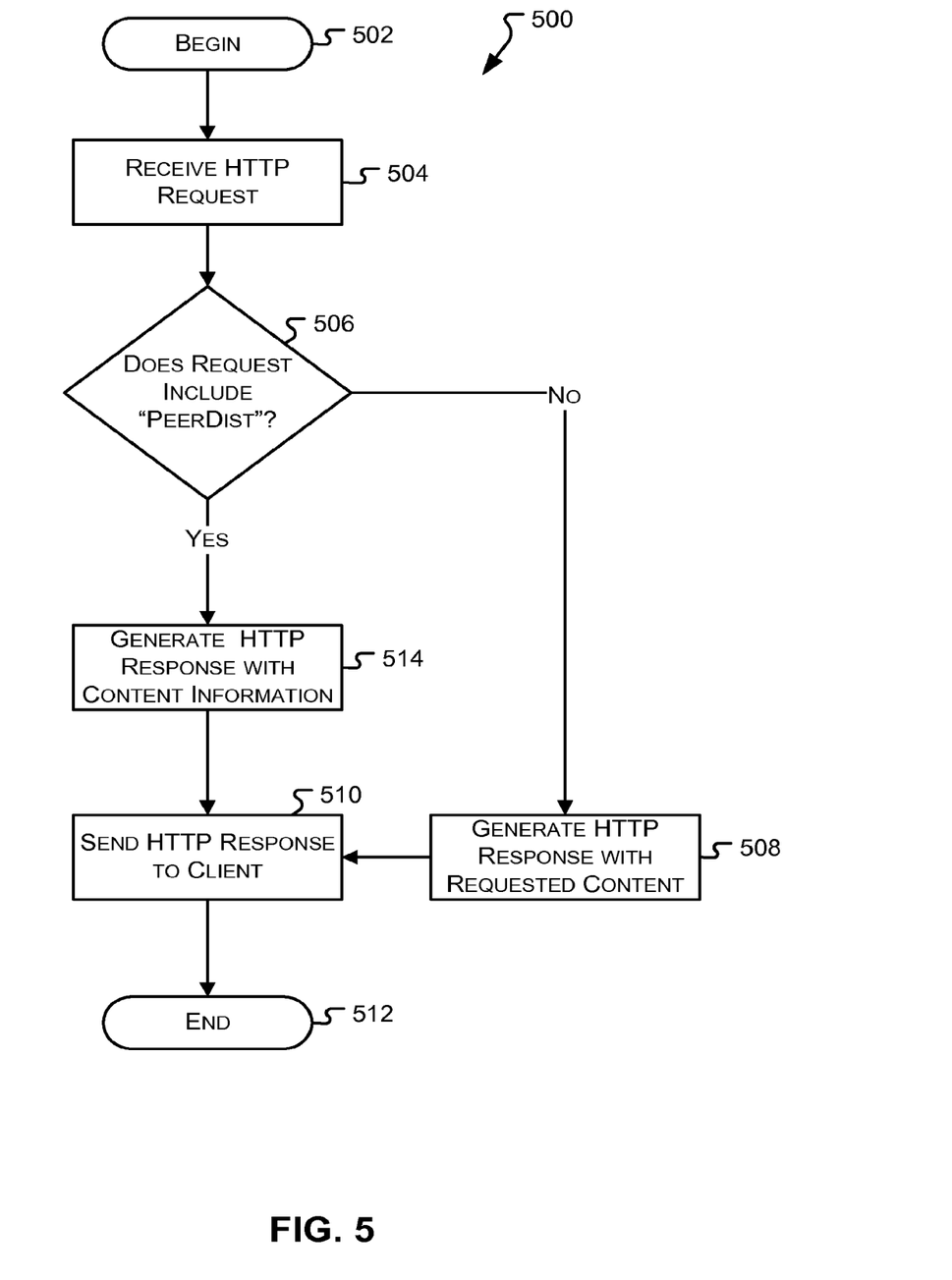
FIG. 5 illustrates a second operational flow for processing requests for content, according to another embodiment.

FIGS. 4 and 5 illustrate operational flows 400 and 500, according to embodiments. Operational flows 400 and 500 may be performed in any suitable environment. For example, the operational flows may be executed in systems such as illustrated in FIGS. 1, 2, and 3. Therefore, the description of operational flows 400 and 500 may refer to at least one of the components of FIGS. 1, 2, and 3. However, any such reference to components of FIGS. 1, 2, and 3 is for descriptive purposes only, and it is to be understood that the implementations of FIGS. 1, 2, and 3 are non-limiting environments for operational flows 400 and 500.

Furthermore, although operational flows 400 and 500 are illustrated and described sequentially in a particular order, in other embodiments, the operations may be performed in different orders, multiple times, and/or in parallel. Further, one or more operations may be omitted or combined in some embodiments.

FIG. 4 illustrates an operational flow 400 according to an embodiment, for requesting content by a client computer that is part of a WAN such as system 100 (FIG. 1). In embodiments, flow 400 will be implemented by clients 104-110 (FIG. 1), 204 (FIG. 2) and 206 (FIG. 2). However, it should be understood that flow 400 is not limited to this specific embodiment. In other embodiments it may be implemented by server computers as part of a WAN.

Flow 400 begins at 402. At operation 404 an HTTP request for content is generated. In embodiments, the request may be generated by a web browser running on the client computer as a result of a user action. For example, a user may input a URL of a web page into the web browser which prompts operation 404 and generation of an HTTP request, e.g., an HTTP GET request.

After the request is generated at operation 404, flow passes to operation 406, where an indication of the client's ability to retrieve content from a peer-to-peer network is included in the request. In one embodiment, the indication is included within a field in a header provided by the HTTP. For example, as indicated above HTTP/1.1 includes an Accept-Encoding header field that is used for indicating compression formats that are acceptable to a client. In one embodiment, the Accept-Encoding field is used to indicate that the client can retrieve information from a peer-to-peer network by specifying "peerdist" in the Accept-Encoding field. It should be understood that in other embodiments the indication may be different and it may be included in a different field of an HTTP header.

Flow then passes to operation 408 where the request generated at operation 404 is sent to a server, such as servers 102, 202, or 300 (FIGS. 1, 2, and 3). At operation 410, a response is received with content information associated with the requested content. Flow passes from operation 410 to operation 412 where a peer-to-peer request for the content is generated and sent using the content information received at operation 410. The peer-to-peer request may be formatted according to any suitable peer-to-peer protocol.

After operation 412, the client will receive a response in reply to the peer-to-peer request sent at operation 412. A determination is made at decision 414 whether the response includes the requested content. If the response received from the peer includes the requested content, flow will end at 416. If a determination is made at operation 414 that the response did not include the requested content, flow passes to operation 418 where a second HTTP request is generated and sent to the server. The second HTTP request does not include the peerdist indication. Thus, when an HTTP response is received at operation 420, the response will include the requested content. Flow 400 ends at 416.

Flow 400 may in some embodiment include additional operations are not shown in FIG. 4. For example, if at operation 414 a determination is made that the peer-to-peer response does not include the requested content, flow 400 may in some embodiments include sending multiple peer-to-peer requests. In some embodiments, peer-to-peer requests may be sent to as many peers as is necessary to retrieve the requested content. In other embodiments, a predetermined number of peer-to-peer requests are set, after which flow 400 proceeds with operations 418 and 420 for requesting and receiving the content from the server. Finally in other embodiments, there may be predetermined period of time for requesting the content from a peer using peer-to-peer requests, after which flow will proceed with operations 418 and 420.

FIG. 5 illustrates an operational flow 500, according to an embodiment, for processing requests received by a server that is part of a WAN such as servers 102 (FIG. 1), 202 (FIG. 2), and 300 (FIG. 3). The server may be for example a Web content server that receives HTTP requests for web pages or other content and sends HTTP responses with the requested information. It should be understood that the following description of flow 500 is not limited to this specific embodiment.

Flow 500 begins at 502 after which at operation 504 an HTTP request is received. The HTTP request may be for example an HTTP GET request sent by a client over a WAN such as the Internet. Flow 500 then passes to decision 506 where a determination is made as to whether the request received at operation 504 includes an indication that the client that sent the request can retrieve content from a peer-to-peer network. For example in one embodiment, the server implementing flow 500 may be configured to receive an HTTP/1.1 request in which case the indication may be a "peerdist" indication included within the Accept-Encoding header field of the HTTP/1.1 header.

If at decision 506, a determination is made that the request does not include an indication that the requesting client can retrieve content from a peer-to-peer network, flow will pass to operation 508 where an HTTP response with the requested content will be generated. After operation 508, flow 500 will pass to operation 510 where the response generated at operation 508 is sent. Flow 500 will then end at 512. If at decision 506 a determination is made that the request received at operation 504 does include an indication that the requesting client can retrieve content from a peer-to-peer network flow passes to operation 514 where an HTTP response with content information is generated.

In embodiments, the content information includes hashes of portions of the requested content. As indicated above with respect to FIG. 3, in embodiments, the hashes may be generated using segments of the requested content. Additional input such as hash keys, secrets, or other information may be used in generating the hashes.

In other embodiments, the content information may not include any hashes at all and instead include identifiers that are associated with the requested content or with portions of the requested content. As those with skill in the art will appreciate, the content information is associated with the content and allows the client to retrieve the content from a peer-to-peer network. There is no particular limitation as to the form of the content information so long as it is associated with the content in a way that allows the content to be identified.

In some embodiments, the content information may be sent as part of a data structure that includes other information. For example, the data structure may in addition to including hashes of the requested content as described above with respect to FIG. 3, will include information identifying the specific hash function used to generate the hashes, information about the length of the requested content, and information regarding the length of the content information (e.g. the hashes).

After operation 514, the HTTP response with the content information is sent at operation 510. Flow 500 then ends at 512. Flow 500 may in some embodiments include additional operations that are not shown in FIG. 5. For example, flow 500 may in some embodiments include generating the content information. In these embodiments, flow 100 may include operations such as parsing the content into blocks and/or segments, and calculating content information by hashing the segments and/or the blocks of the content. In other embodiments, flow 500 may also include sending hash keys or secrets to requesting clients so that the clients can hash the content information, if necessary. Finally, those with skill in the art will appreciate flow 500 may in some embodiments include authentication or other security operations to ensure that a requesting client has authorization to receive the content or content information.

Figure 6:
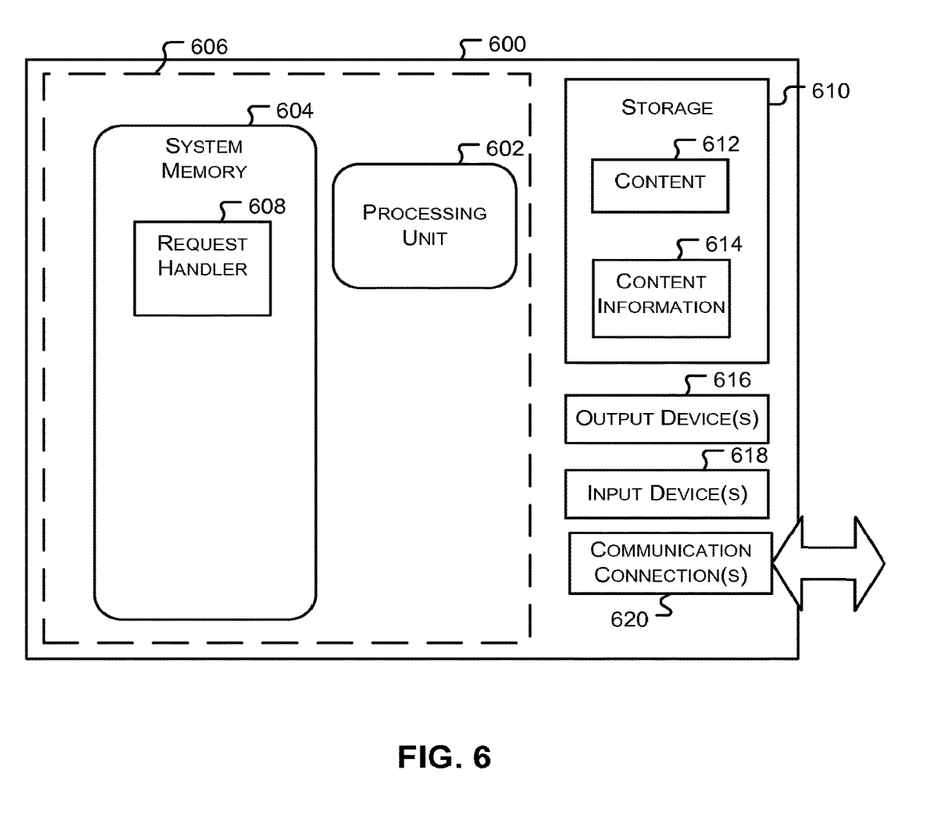
FIG. 6 illustrates a block diagram of a computing environment suitable for implementing embodiments.

FIG. 600 illustrates a general computer environment 600, which can be used to implement the embodiments described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

In its most basic configuration, environment 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. As shown in FIG. 6, request handler 608 may be loaded into system memory 604 to process requests received by environment 600. The request handler 608 may be used when environment 600 is performing flow 500 described in FIG. 5.

Additionally, environment 600 may also have additional features/functionality. For example, environment 600 may also include additional storage 610 (removable and/or non-removable) including, but not limited to, magnetic or optical disks or tape. Such additional storage is illustrated in FIG. 6 by storage 610. As shown in FIG. 6, storage 610 may store content 612 and content information 614 which are necessary for generating responses to requests for content received by environment 600.

Computer storage media includes volatile and nonvolatile, removable and non-removable media implemented in any method or technology for storage of information such as computer readable instructions, data structures, program modules or other data. Memory 604 and storage 610 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by environment 600. Any such computer storage media may be part of environment 600.

System 600 may also contain communications connection(s) 620 that allow the system to communicate with other devices. Communications connection(s) 620 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Environment 600 may also have input device(s) 618 such as keyboard, mouse, pen, voice input device, touch input device, etc. Output device(s) 616 such as a display, speakers, printer, etc. may also be included. All these devices are well know in the art and need not be discussed at length here.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems of the embodiments disclosed herein without departing from the scope of the claimed embodiments.

We claim:

1. A computer implemented method of retrieving information from a server computer connected to a network, the method comprising:
   generating by a client computer a first request for content stored on the server computer;
   including in the first request an indication that the client computer is capable of retrieving the content from a peer computer in a peer-to-peer network;
   sending the first request to the server;
   receiving, from the server, a first response that does not include the content;

based on the first response, generating a second request for the content, wherein the second request repeats the first request without the indication that the client computer is capable of retrieving the content from a peer computer in the peer-to-peer network;
sending the second request to the server; and
receiving a second response from the server with the content.

2. The method of claim 1, wherein the first request and second request are generated by a web browser running on the client computer.

3. The method of claim 1, wherein the first request and the second request are HTTP requests.

4. The method of claim 3, wherein the indication of the client computer being capable of retrieving the content from a peer computer is included in a header field of the first request.

5. The method of claim 3, wherein the first response includes content information about the content, wherein the content information allows the client computer to retrieve the content from the peer computer.

6. The method of claim 5, wherein the content information comprises a hash value calculated using at least a portion of the content as input.

7. The method of claim 1, wherein the content information comprises hashes of segments and blocks of the requested content.

8. The method of claim 1, wherein the content information is sent within a data structure that includes additional information.

9. The method of claim 1, further comprising:
sending a hash key to enable the client computer to hash the content information.

10. The method of claim 1, further comprising:
prior to sending the second request to the server, generating and sending a third request to the peer computer.

11. One or more computer storage devices storing computer executable instructions for performing a method of processing a request from a client computer, the method comprising:
generating by a client computer a first request for content stored on the server computer;
including in the first request an indication that the client computer is capable of retrieving the content from a peer computer in a peer-to-peer network;
sending the first request to the server;
receiving, from the server, a first response that does not include the content;
based on the first response, generating a second request for the content, wherein the second request repeats the first request without the indication that the client computer is capable of retrieving the content from a peer computer in the peer-to-peer network;
sending the second request to the server; and
receiving a second response from the server with the content.

12. The one or more computer storage devices of claim 11, wherein the first request and second request are generated by a web browser running on the client computer.

13. The one or more computer storage devices of claim 11, wherein the first request and the second request are HTTP requests.

14. The one or more computer storage devices of claim 13, wherein the indication of the client computer being capable of retrieving the content from a peer computer is included in a header field of the first request.

15. The one or more computer storage devices of claim 11, wherein the first response includes content information about the content, wherein the content information allows the client computer to retrieve the content from the peer computer.

16. The one or more computer storage devices of claim 15, wherein the content information comprises a hash value calculated using at least a portion of the content as input.

17. A computer system for processing a request for content received from a client computer, the system comprising:
one or more processors;
one or more computer readable storage media, operatively connected to the one or more processors and storing computer executable instructions that, when executed by the one or more processors, perform a method comprising:
receiving from the client computer a first request for content, wherein the first request comprises an indication that the client computer is capable of retrieving the content from a peer computer in a peer-to-peer network;
determining that the first request includes the indication that the client computer is capable of retrieving the content from a peer computer in a peer-to-peer network;
in response to determining that the first request includes the indication that the client computer is capable of retrieving the content from the peer computer, generating a response that does not include the content;
sending the response to the client computer;
receiving a second request for the content, wherein the second request is based on the response and repeats the first request without the indication that the client computer is capable of retrieving the content from a peer computer in the peer-to-peer network; and
determining that the second request does not include the indication that the client computer is capable of retrieving the content from a peer computer in the peer-to-peer network;
in response to determining that the second request does not include the indication, sending the content to the client computer.

18. The system of claim 17, wherein the response comprises content information about the content.

19. The system of claim 18, wherein the content information allows a client to retrieve the content from the peer computer.

20. The system of claim 18, further comprising:
authenticating the client computer prior to sending the content.

* * * * *